H. A. STOCK.
FILTER.
APPLICATION FILED OCT. 18, 1919.
1,358,595. Patented Nov. 9, 1920.
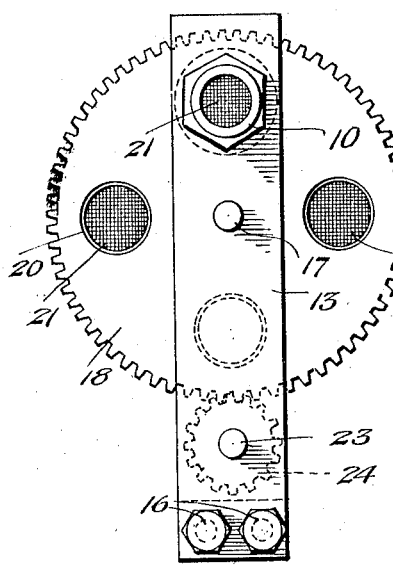
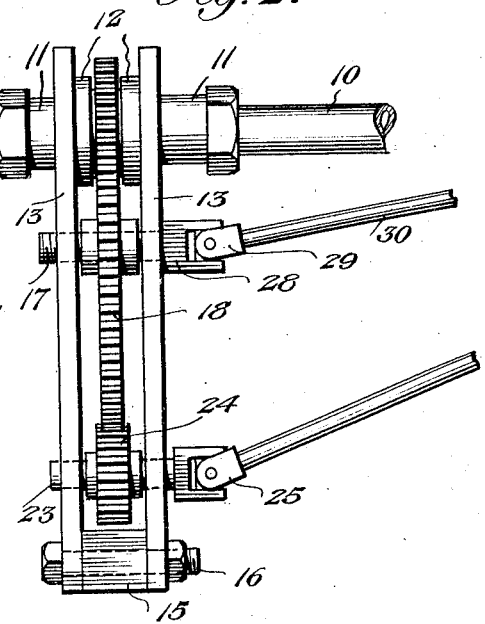
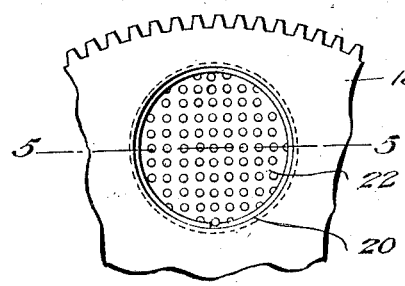
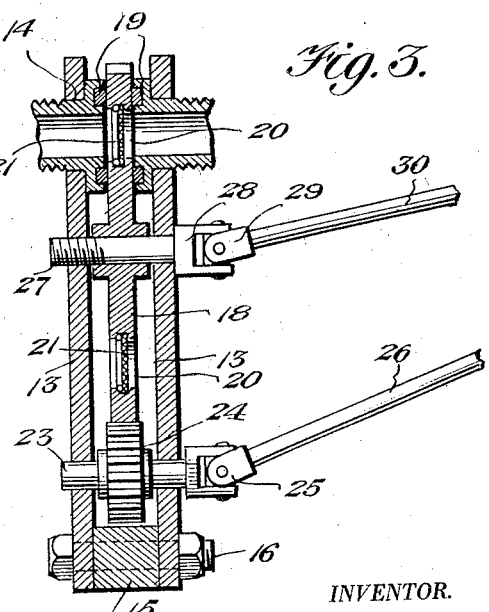
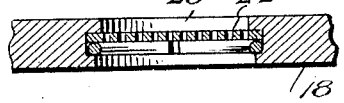
WITNESS:
INVENTOR.
BY Harry A. Stock
Victor J. Evans
ATTORNEY.

UNITED STATES PATENT OFFICE.

HARRY A. STOCK, OF STEELTON, PENNSYLVANIA.

FILTER.

1,358,595.   Specification of Letters Patent.   Patented Nov. 9, 1920.

Application filed October 18, 1919. Serial No. 331,562.

*To all whom it may concern:*

Be it known that I, HARRY A. STOCK, a citizen of the United States, residing at Steelton, in the county of Dauphin and State of Pennsylvania, have invented new and useful Improvements in Filters, of which the following is a specification.

This invention relates to filtering devices and has for an object the provision of a filter which is especially adapted for use in straining or filtering gasolene, the device being capable of attachment to the feed pipe of the gasolene engine of an automobile, or of use in various other places.

Another object is the provision of a filtering device in which the strainer may be quickly removed and another substituted in the event of interruption of the passage of liquid through the strainer.

Another object of the invention is to provide means for effecting such substitution at a point remote from the strainer, so as to adapt the invention for use upon motor vehicles.

The invention further includes novel means for securing the screen or filtering element in position, so as to bring the same in the path of liquid passing through the pipe line.

Other objects and advantages of the invention will appear as the following description is read in connection with the accompanying drawings.

In the drawings:

Figure 1 is an elevation of the invention.

Fig. 2 is a view at right angles to Fig. 1.

Fig. 3 is a central vertical sectional view.

Fig. 4 is a fragmentary elevation of a portion of the rotatable member, showing a modified form of strainer.

Fig. 5 is a section on the line 5—5 of Fig. 4.

In the drawings, the invention is illustrated in connection with a pipe line, which may be the fuel supply pipe of a gas engine, or it may represent a pipe used for conveying any other liquid which it is desired to filter.

In applying the invention, the pipe line is formed in separate sections, which are indicated at 10. The adjacent ends of these sections are spaced apart and are provided with sleeves or thimbles 11, the latter having their opposed ends formed with a radially extending peripheral flange 12. Mounted upon the sleeves or thimbles 11 are spaced parallel arms 13, one end of each of these arms being provided with an opening 14 to receive the sleeves or thimbles and the opposite ends of the said arms being connected by a spacing block 15 and bolts 16. By this means the arms 13 which comprise the supporting frame for the removable parts of a filter, may be readily positioned upon the ends of the pipe sections 10, so as to be securely held thereon.

Mounted upon a short shaft 17, which passes through the arms 13, is a rotatable member in the form of a gear wheel 18, the opposite faces of the said wheel passing between the opposed faces of the flanges 12 and contacting with a gasket 19, carried by each of said flanges. This provides a leakproof joint between the gear 18 and the adjacent ends of the pipe sections.

The gear 18 is provided with spaced openings 20, in which are carried filtering elements 21. These elements may be in the form of a cloth screen, such as is usually employed for straining gasolene, or it may be a perforated plate 22, such as is illustrated in Figs. 4 and 5 of the drawings. It is also apparent that chamois may be substituted for either the screen 21 or the plate 22.

Mounted in bearings in the arms 13 is a shaft 23, the latter having secured thereon a pinion 24, which engages the teeth of the gear 18, so that by turning the pinion, the gear will be revolved to bring one of the filtering elements 21 into register with the bore of the pipe sections. When the device is used upon a motor vehicle the shaft 23 is connected by means of a universal joint 25 with an operating rod 26, and the latter may extend within convenient reach of the driver of the vehicle.

In addition to providing a shaft for the support of the wheel 18, the said shaft has one of its ends threaded, as shown at 27 and the opening through which this end of the shaft passes is also threaded. The opposite end of the shaft carries a head 28, which abuts against one of the arms 13, so that when the shaft is rotated contact of the gasket 19 with the gear 18 may be regulated. In the present showing of the invention, the head 28 is formed by a universal joint 29, which has connected thereto one end of a rod 30, and this rod may also extend within convenient reach of the vehicle driver.

It is, of course, apparent that where it is not necessary to operate the device from a remote point, the wheel 24 may be dispensed with and a suitable operating handle provided for the shaft 17 and the wheel 18 rotated in any desired manner.

The invention is susceptible of various changes in its form, proportions and minor details of construction and the right is herein reserved to make such changes as properly fall within the scope of the appended claims.

Having described the invention, what is claimed is:

1. A filter comprising a pipe formed in separate sections, the adjacent ends of which are spaced apart, a rotatable circular disk member capable of passage through said space, a plurality of concentrically arranged spaced filtering elements carried by said member for position across the bore of the pipe, means for providing a leak-proof joint between the pipe sections and the rotatable member and means engageable with the perforated disk for rotating said member.

2. A filter comprising a pipe formed in separate sections, the adjacent ends of which are spaced apart, a frame secured to the adjacent pipe sections, a member mounted for movement in said frame and capable of passage between the ends of the pipe sections, a plurality of filtering elements carried by said member and means carried by the frame for operating said member to move the filtering elements across the bore of the pipe sections.

3. A filter comprising a pipe formed in separate sections, the adjacent ends of which are spaced apart, a frame secured to the adjacent pipe sections, a member mounted for movement in said frame and capable of passage between the ends of the pipe sections, a plurality of filtering elements carried by said member and means carried by said frame and operable from a remote point to move the filtering elements across the bore of the pipe sections.

In testimony whereof I affix my signature.

HARRY A. STOCK.